(12) United States Patent
Doring et al.

(10) Patent No.: US 8,173,899 B2
(45) Date of Patent: May 8, 2012

(54) BUSWAY EDGEWISE ELBOW DRAIN

(75) Inventors: Alejandro Rodriguez Doring, Grenoble (FR); Cesar Augusto Rivas Guerra, Monterey (MX)

(73) Assignee: Schneider Electric USA, Inc., Palatine, IL (US)

( * ) Notice: Subject to any disclaimer, the term of this patent is extended or adjusted under 35 U.S.C. 154(b) by 392 days.

(21) Appl. No.: 12/425,536

(22) Filed: Apr. 17, 2009

(65) Prior Publication Data

US 2010/0263901 A1    Oct. 21, 2010

(51) Int. Cl.
*H02G 5/00*    (2006.01)

(52) U.S. Cl. ............ 174/68.2; 174/16.2; 174/70 B; 174/71 B; 174/72 B; 174/88 B; 174/99 B; 174/129 B

(58) Field of Classification Search ........... 174/16.2, 174/68.2, 70 B, 71 B, 72 B, 88 B, 99 B, 129 B; H02G 5/00
See application file for complete search history.

(56) References Cited

U.S. PATENT DOCUMENTS

| | | | | |
|---|---|---|---|---|
| 3,376,052 A | * | 4/1968 | Zimmerer et al. | 285/5 |
| 3,401,230 A | | 9/1968 | Giger, Jr. | |
| 3,427,396 A | * | 2/1969 | Giger, Jr. et al. | 174/68.2 |
| 3,546,356 A | * | 12/1970 | Graybill et al. | 174/21 C |
| 3,585,271 A | * | 6/1971 | Reynolds et al. | 174/16.2 |
| 3,786,170 A | * | 1/1974 | Floessel | 174/28 |
| 3,792,187 A | * | 2/1974 | Depcrymski | 174/21 C |
| 3,931,451 A | * | 1/1976 | Durschner et al. | 174/11 R |
| 4,017,675 A | * | 4/1977 | Hopkins et al. | 174/21 C |
| 4,059,723 A | * | 11/1977 | Floessel | 174/21 R |
| 4,141,054 A | * | 2/1979 | Colaiaco | 361/602 |
| 6,329,598 B1 | | 12/2001 | M'Sadoques et al. | |
| 2005/0052801 A1 | * | 3/2005 | Ghali | 361/62 |
| 2010/0263901 A1 | * | 10/2010 | Doring et al. | 174/68.2 |

OTHER PUBLICATIONS

Busway Systems by Schneider Electric; Catalog 5600CT9101 07; Class 5600; Dated Nov. 2007 (90 pages).

* cited by examiner

*Primary Examiner* — John K Kim

(57) ABSTRACT

A water drain for a busway housing at the lowest point in a busway, typically at the elbow transition from vertical to horizontal and at the outside to inside junction of a building. There is a bulge made in the lowermost housing edge with a drain hole. A cap is fitted over the drain hole so no debris/conductors can blow in, but water leaks out.

12 Claims, 5 Drawing Sheets

BUSWAY EDGEWISE ELBOW DRAIN

FIELD OF THE INVENTION

This invention relates generally to busways, and, more particularly, to a busway having an edgewise elbow drain and a drain cap.

BACKGROUND

On "riser" busway applications in which the busbar conductors are vertically oriented, water can eventually get into the busway, trickle down to the bottom-most fitting and collect there, potentially causing a safety hazard because the fittings currently do not have the capability to drain the water effectively. At the same time, it is important to prevent objects (fingers, probes, and the like) and debris from getting into the busway housing, because the busbar conductors carry deadly levels of electrical current. Water and electricity are a bad combination, so it is vital that the exterior of the busway housing be secured against accidental or deliberate attempts to introduce objects into the housing.

What is needed, therefore, is solution that allows water to drain out of a busway housing while preventing objects or debris from going into the housing. The present disclosure is directed to addressing these and other needs.

BRIEF SUMMARY

This invention addresses the problem of water accumulating in the lower-most elbow of a busway housing to reduce the likelihood of creating a safety hazard while also providing solid ingress protection, such as defined by an IP4X rating. This invention proposes a special form (sometimes referred to as a bubble form) on the lower-most fitting bottom that allows water that falls down into the busway housing to drain away from the busbar conductors housed within the busway. These conductors are typically fully insulated, e.g. encased in a dielectric such as epoxy. The housing bottom also has a drain hole somewhere on the bubble form to drain water that collects in the elbow. A snugly fitting cap seals and covers the drain hole, permitting water to be drained out while at the same time preventing objects or debris from going into the busway housing.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1A:
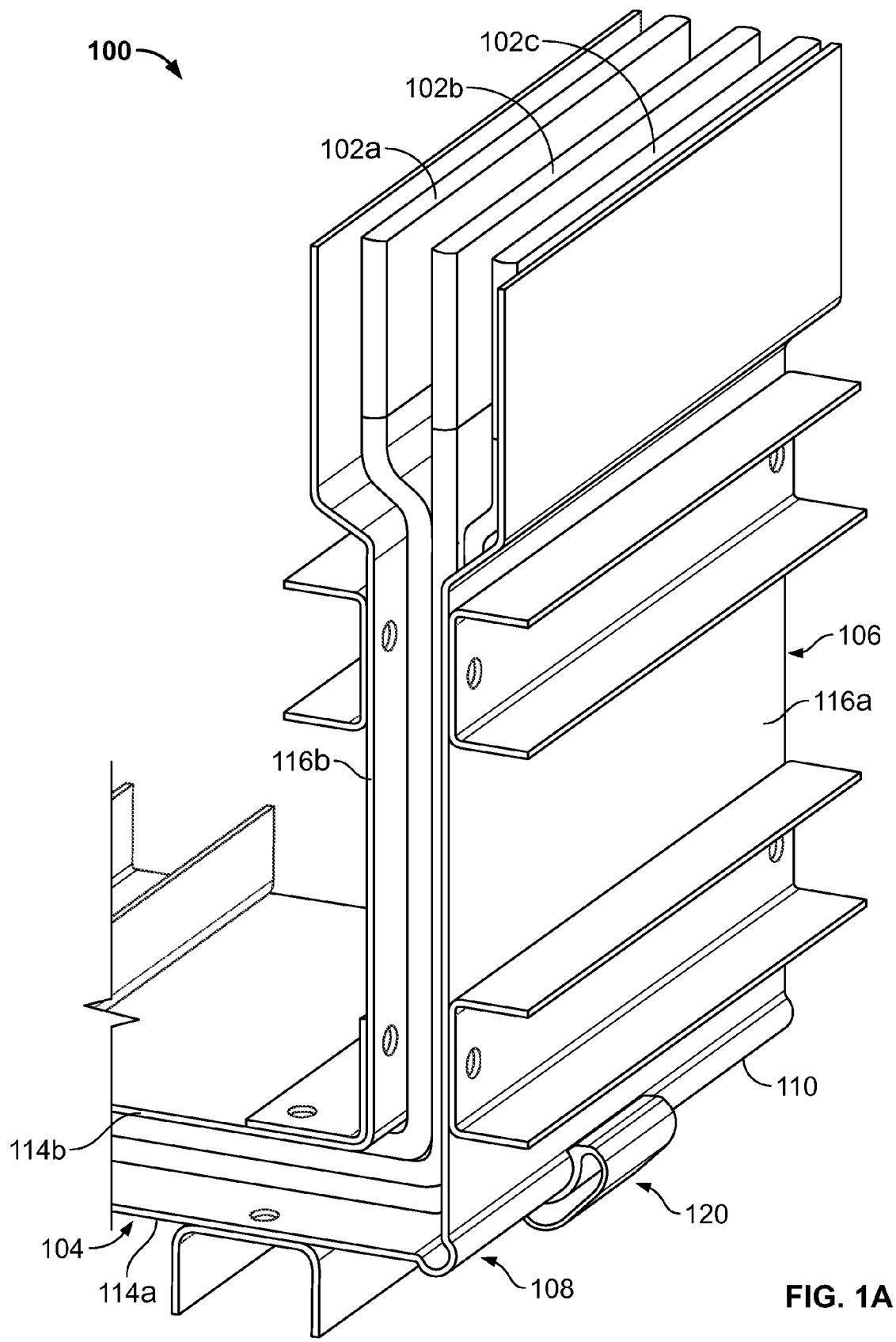
FIG. 1A is an isometric view of a busway housing incorporating an elbow drainage feature and a drain cap according to an aspect of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1A is a isometric view of a busway housing 100 (side rails removed) incorporating the elbow drainage feature of the present invention. The busway housing 100 houses one or more insulated busbar conductors 102a-c (three shown in FIG. 1, one for each phase). The busway housing 100 includes a horizontal portion 104 that transitions to a vertical portion 106 at an edgewise elbow portion 108. The elbow portion has a convex rounded profile to form a channel along the edge 110 of the elbow portion 108. This convex rounded profile is also referred to as a bubble form, because the cross section of the elbow portion is circular, and the convex orientation of the elbow portion 108 juts outward and away from the horizontal and vertical portions 104, 106. The busbar conductors 120a-c follow the profile of the busway housing 100, and are also horizontal in the horizontal portion 104 and bend orthogonally into a vertical orientation (so-called "risers") in the vertical portion 106.

Figure 3A:
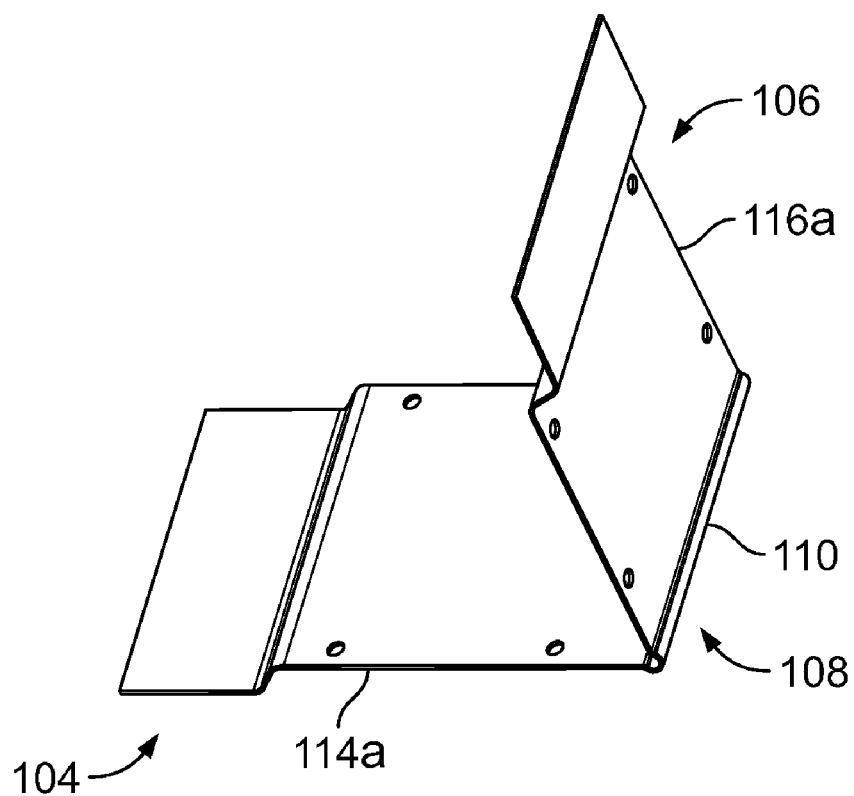
FIG. 3A is an isometric view of part of the busway housing having the elbow portion.

The horizontal portion 104 of the busway housing 100 includes a first horizontal member 114a spaced a distance away from and parallel to a second horizontal member 114b. The spacing is sufficient to accommodate the one or more busbar conductors 102a-c. The vertical portion 106 includes a first vertical member 116a spaced a distance away and parallel to a second vertical member 116b. The first horizontal member 114b and the first vertical member 116b meet at the elbow portion 108. Preferably, the first horizontal and vertical members 114a, 116a and the elbow portion 108 are integral to one another and formed as a single part, as shown in FIG. 3A.

Figure 1B:
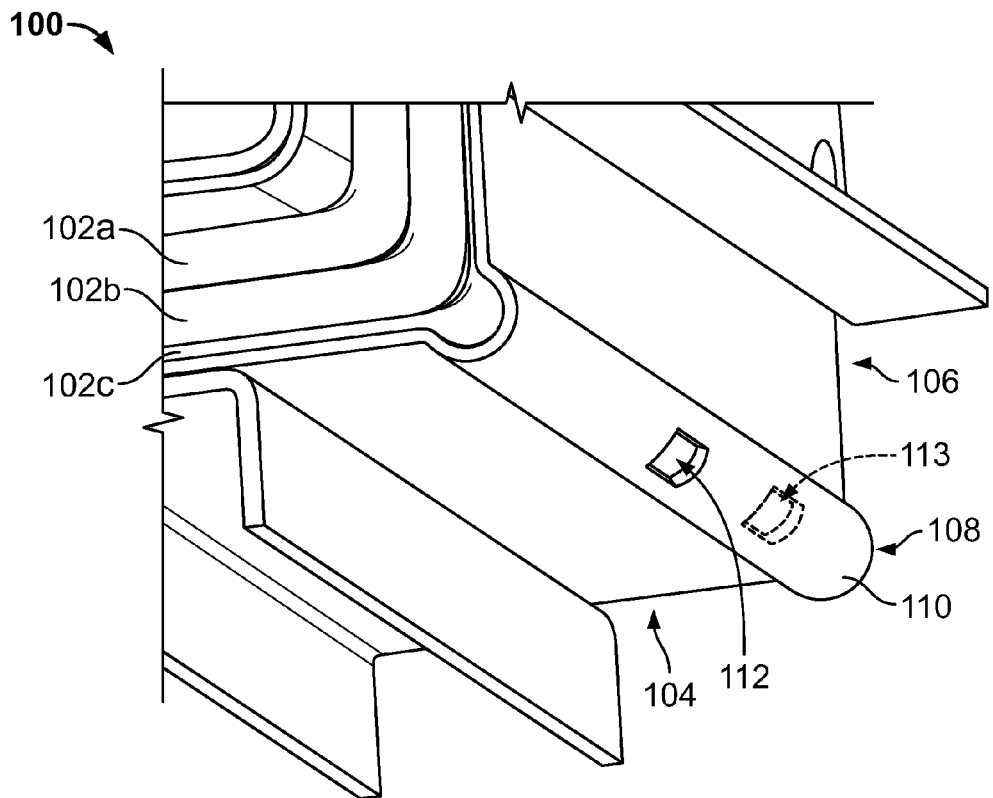
FIG. 1B is an isometric view of the bottom of the elbow portion of the busway housing shown in FIG. 1A to reveal a drain hole.

As can be seen from FIG. 1B, the elbow portion 108 includes a drain hole 112 formed in the channel formed along the edge 110 for draining liquid that collects therein. In this example, the drain hole 112 is formed in approximately the center of the elbow portion 108, but the drain hole 112 can be positioned at any point other than the center along the elbow portion 108. The illustrated drain hole 112 has a rectangular shape, but of course the drain hole 112 can have any regular or irregular shape or can comprise more than one hole 112, 113, like a sieve or a grid. By draining liquids out the drain hole 112, the elbow portion 108 advantageously reduces the likelihood of a safety hazard caused by liquid otherwise pooling in the bottom elbow portion of the transition between the horizontal and vertical portions of the busway housing in busway housings that lack the elbow portion 108 of the present invention.

Figure 3B:
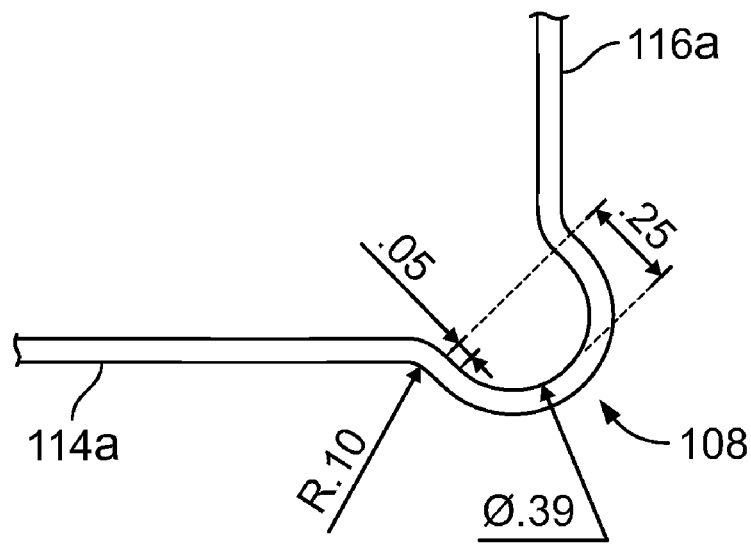
FIG. 3B is a side view of part of the busway housing showing one end of the elbow portion.

A side view of a mechanical drawing of the elbow portion 108 is shown in FIG. 3B, with the dimensions shown in inches. The diameter of the convex rounded profile is approximately 0.39 inches in this non-limiting example. Other exemplary dimensions are shown in FIG. 3B.

An IP4X rating (also referred to as IP Code) is generally a type of Ingress Protection Rating, and is defined in the IEC (International Electrotechnical Commission) 60529, and classifies degrees of protection provided against the intrusion of solid objects (including body parts like hands and fingers), dust, accidental contact, and water in electrical enclosures. Although IP4X is one rating system that can be used herein, other similar ratings can be used, such as corresponding North American enclosure ratings defined by NEMA (National Electrical Manufacturers Association) 250, UL (Underwriters Laboratory) 50 or 508, or CSA (Canadian Standards Association) C22.2 No. 94. The digit 4 in IP4X refers to protection against access by objects greater than 1 millimeter, which is the smallest object dimension specified in the IP rating.

Figure 1C:
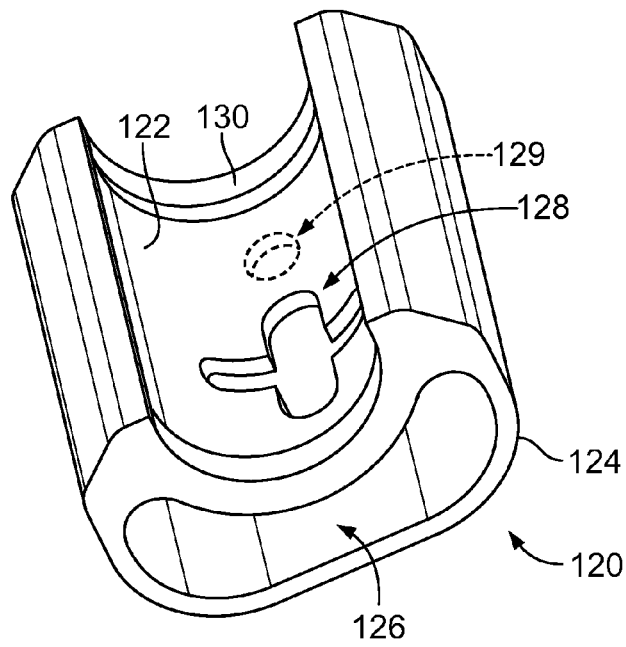
FIG. 1C is an isometric view of a drain cap that is fitted against the elbow portion shown in FIG. 1B.
Figure 4A:
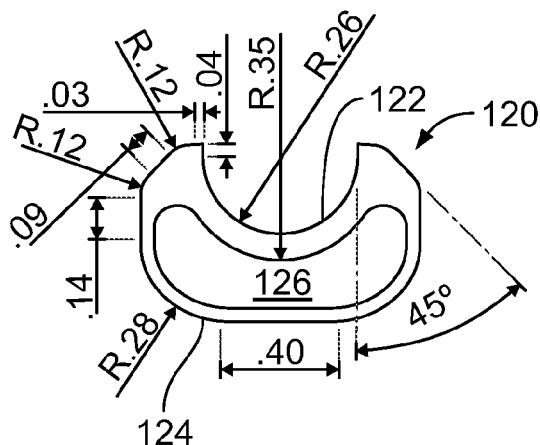
FIGS. 4A-4E are various views of scaled mechanical drawings of the drain cap shown in FIG. 1C.
Figure 4B:
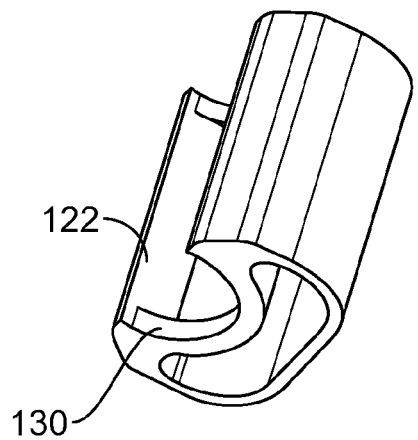
Figure 4C:
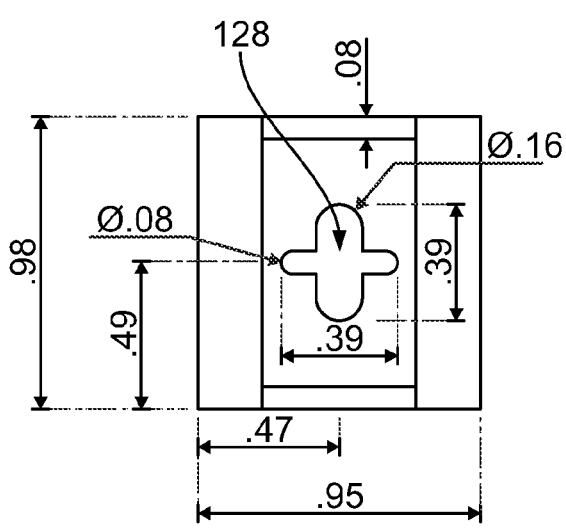
Figure 4D:
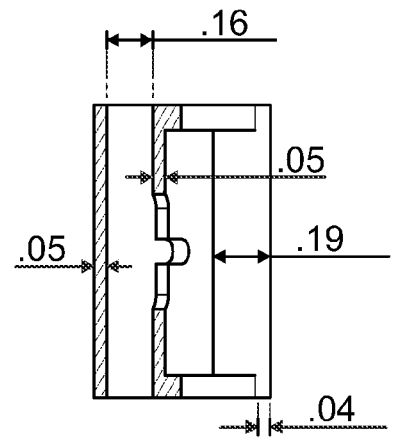
Figure 4E:
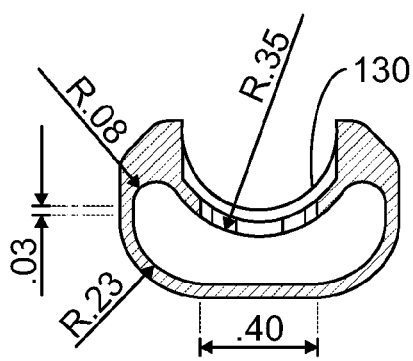

The exposed drain hole 112 would not pass an IP4X rating, because an object greater than 1 mm could easily penetrate into the interior of the busway housing 100. An object small enough to penetrate into the exposed drain hole 112 would create a safety hazard as a result of the exposed busbar conductor 102c, a hazard that is exacerbated by the presence of water. Accordingly, a drain cap 120 (FIG. 1C) is positioned to abut against an exterior surface of the elbow portion 108 adjacent the drain hole 112. The busway housing 100 alone or in combination with the drain cap 120 is referred to as an edgewise drainage assembly. The drain cap 120 completely covers the drain hole 112 so that any liquids accumulating in the elbow portion 108 drain directly into the drain cap 120. The drain cap has two walls, a first wall with a concave rounded surface 122 and a second wall with an exterior surface 124 that opposes the concave rounded surface 122, respectively. A cavity 126 is defined between the concave rounded and exterior surfaces 122, 124. The cavity 126 is open at either end of the drain cap 120 to allow liquids to drain out the ends of the drain cap 120. The drain cap 120 includes an aperture 128 (see FIG. 4C) that is opposite the drain hole and spaced a distance away from the drain hole by the thickness of a sealing edge or lip 130 extending along the ends of the concave rounded surface 122 as shown in FIGS. 1C and 4E.

The exterior surface 122 of the drain cap 120 is continuous and has no holes or apertures therein to prevent an IP4X 1 mm straight probe or other object from ingressing into the busway housing 100. The dimensions of the cavity 126 and the position and shape of the aperture 128 are selected to prevent any object from entering into the drain hole 112 from the ends of the drain cap 120. The aperture 128 has a crosshatch profile and includes a rounded rectangular portion with two opposing rounded tabs extending from the center of the rounded rectangular portion as shown in FIG. 4C. This configuration of the aperture 128 allows liquid to drain into the cavity 126 but prevents an IP4X object introduced into the ends of the cavity or debris that is blown into the cavity from penetrating into or accumulating against the drain hole 112. The aperture 128 can alternately include more than one aperture 128, 129, resembling a sieve or a grid pattern.

The aperture 128 is positioned in the center of the concave rounded surface 122, and the center of the aperture 128 aligns with the center of the drain hole 112 when the drain cap 120 is fitted against the elbow portion 108. Exemplary dimensions in inches are shown in FIGS. 4A-4E. All dimensions herein are exemplary only, and those skilled in the art will appreciate that many other dimensions would be suitable for carrying out the invention without departing from the spirit and scope of it. Preferably, the drain cap 120 snaps or clicks into place against the elbow portion 108. Alternately, the drain cap 120 can be secured against the elbow portion 108 using any conventional means.

Figure 2:
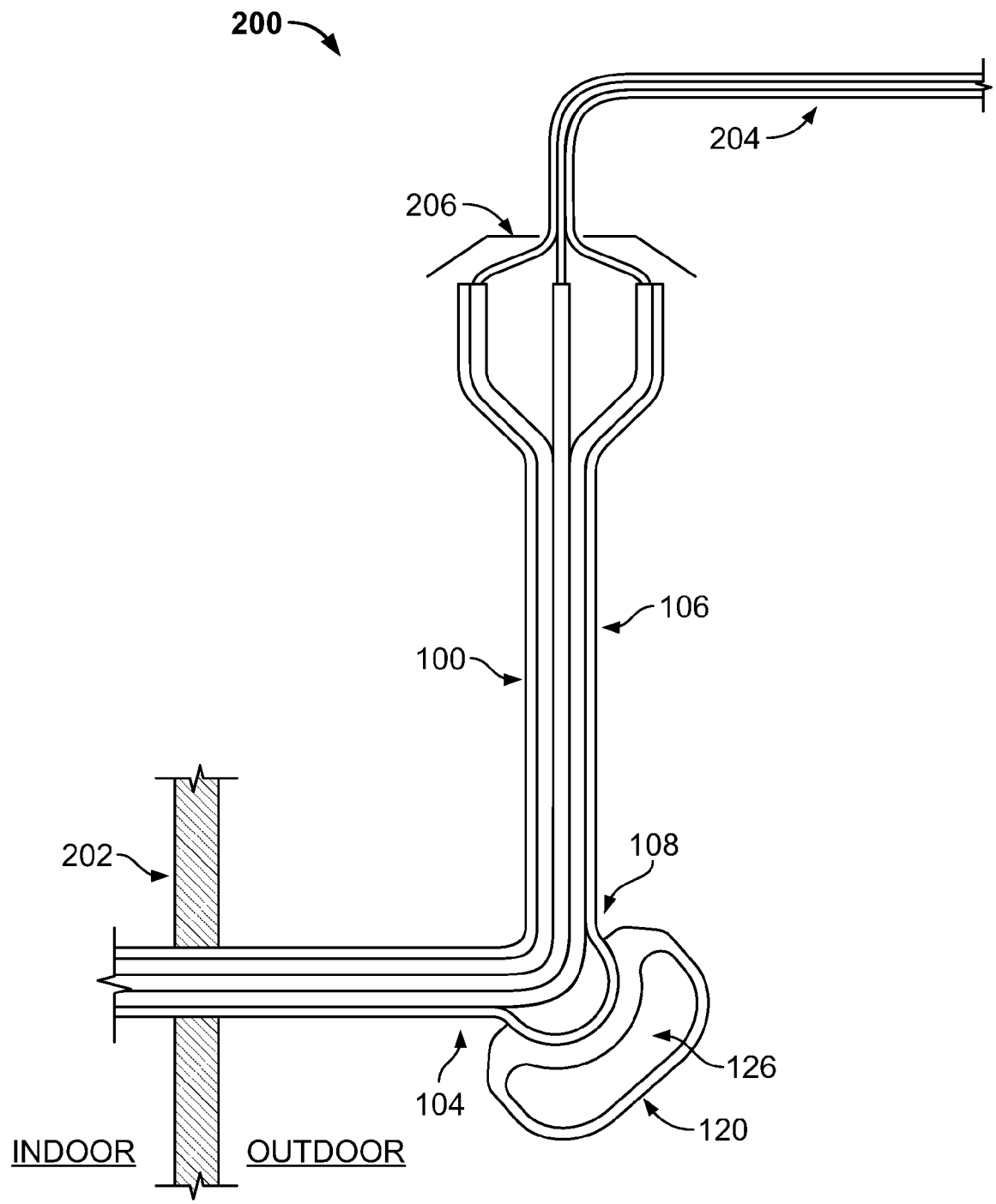
FIG. 2 is a functional diagram of an installation of the busway housing of FIGS. 1A-1C at the outdoor-to-indoor junction of a building.

A typical installation 200 incorporating the busway housing 100 and the drain cap 120 of the present invention is shown in FIG. 2. A cross-sectional view of the busway housing 100 is shown with the busway housing 100 installed between an indoor and outdoor environment. The sizes of the elbow portion 108 and the drain cap 120 have been exaggerated and are not drawn to scale. Scaled drawings of the elbow portion 108 and the drain cap 120 are shown in FIGS. 3A-4E. The horizontal portion 104 of the busway housing 100 enters the indoor environment through a wall 202 of a building or structure. A hood 206 is placed over the exposed end of the vertical portion 106, and conductors 204 are fed out of a hole in the hood 206 for connection to the power utility lines from the utility company. These conductors 204 typically carry one (in the case of one conductor) or three-phase 120VAC or 240VAC current. The drain cap 120 is fitted to abut snugly against the lower-most section of the elbow portion 108 so that any liquids, such as rain or snow, the accumulate in the elbow portion 108 area drain out of the elbow portion 108, into the drain cap 120, and out the open ends of the cavity 126 of the drain cap 120. At the same time, the drain cap 120 prevents an IP4X probe from being introduced into the interior of the busway housing 100. Thus, the elbowed configuration with the drain cap of the present invention advantageously drains liquids safely away from the busbar conductors 102a-c and also prevents objects from entering the interior of the busway housing 100 to the exposed busbar conductors 120a-c, which carry deadly levels of electrical current. The horizontal portion 104 is generally level relative to earth or can be installed so that it tilts slightly downward as it exits the wall 202 from indoors to outdoors to prevent any pooled liquids from ingressing into the building.

In the illustrated examples, liquid drains out of the drain cap 120 through one of the open ends of the cavity 126. The objectives are a drain cap that allows liquid to drain away from the busway housing 100 while also preventing IP4X objects (greater than 1 mm) from being introduced into the interior of the busway housing 100 through the drain hole 112. Accordingly, those skilled in the art can appreciate any number of variations of the drain cap will achieve these objectives. The aperture 128 in the drain cap 120 needs to be positioned a sufficient distance away from the opening through which the liquid drains such that a straight object (e.g., a long straight probe having a diameter greater than 1 mm) introduced into the opening cannot penetrate into the drain hole 112 of the busway housing 100. The opening of the drain cap through which liquid drains also needs to be sized and shaped to prevent any line-of-sight angle for an object to penetrate through both the opening of the drain cap and the drain hole 112.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. An edgewise drainage assembly for a busway housing, comprising:
   a busway housing for housing busbar conductors, the busway housing having a horizontal portion that transitions to a vertical portion at an edgewise elbow portion, the elbow portion having a convex profile to form a channel along an edge of the elbow portion, the elbow portion including a drain hole formed in the channel for draining liquid that collects therein; and a drain cap configured to abut against an exterior surface of the elbow portion and covering the drain hole, the drain cap having exterior walls defining a cavity therebetween that is open at an end of the drain cap to permit the liquid to drain out the end of the drain cap to an area exterior to both the cavity and the busway housing.

2. The assembly of claim 1, wherein one of the walls has a concave surface and another of the walls defines an exterior surface, the concave surface opposing the exterior surface of the elbow portion, the concave and exterior surfaces defining the cavity.

3. The assembly of claim 2, wherein the drain cap further includes an aperture opposite the drain hole and spaced a distance away therefrom, such that the liquid drains out the drain hole through the aperture into the cavity and out the open end of the drain cap.

4. The assembly of claim 1, wherein the drain cap includes a lip along a concave surface to form a seal that engages the exterior surface of the elbow portion and to maintain the spaced distance between an aperture and the drain hole.

5. The assembly of claim 1, wherein the exterior surface of the drain cap is continuous to prevent an object whose narrowest dimension exceeds 1 millimeter from entering the housing.

6. The assembly of claim 1, wherein the busbar conductors extend along the vertical portion of the busway housing and include connections to a utility grid at a top of the vertical portion.

7. The assembly of claim 1, wherein the busway housing is installed between an indoor structure and outdoors such that the vertical portion of the busway housing is outdoors.

8. An edgewise drainage assembly for a busway housing, comprising:

a busway housing for housing busbar conductors, the busway housing having a horizontal portion that transitions to a vertical portion at an edgewise elbow portion, the elbow portion having a convex rounded profile to form a channel along an edge of the elbow portion, the elbow portion including a drain hole formed in the channel for draining liquid that collects therein; and a drain cap positioned against an exterior surface of the elbow portion and covering the drain hole, the drain cap having a concave rounded surface and an exterior surface, the concave rounded surface opposing the exterior surface of the elbow portion, the concave rounded and exterior surfaces defining a cavity that is open at an end of the drain cap, the drain cap including an aperture opposite the drain hole, the aperture located a distance away from the open end such that a straight object introduced into the open end does not penetrate into the drain hole, and such that the liquid drains out the drain hole through the aperture into the cavity and out the open end of the drain cap to an area exterior to the cavity.

9. The assembly of claim 8, wherein the drain cap includes a lip along the concave rounded surface to form a seal that contacts the exterior surface of the elbow portion and maintains the spaced distance between the aperture and the drain hole.

10. The assembly of claim 8, wherein the drain hole or the aperture or both include multiple apertures.

11. An edgewise drainage assembly for a busway housing, comprising:

a busway housing for housing busbar conductors, the busway housing having a horizontal portion that transitions to a vertical portion at an edgewise elbow portion, the elbow portion having a convex profile to form a channel along an edge of the elbow portion, the elbow portion including a drain hole formed in the channel for draining liquid that collects therein;

a drain cap configured to abut against an exterior surface of the elbow portion adjacent the drain hole and covering the drain hole, the drain cap having external walls defining a cavity therebetween that is open at both ends of the drain cap to permit the liquid to drain out either of the ends of the drain cap.

12. The assembly of claim 11, wherein the aperture has a crosshatch profile to prevent an object introduced into the open end of the cavity from penetrating into the drain hole.

* * * * *